US005743097A

United States Patent [19]

Frank

[11] Patent Number: 5,743,097
[45] Date of Patent: Apr. 28, 1998

[54] APPARATUS AND METHOD FOR CONTROLLING THE FLOW RATE OF REFRIGERANT TO A REFRIGERATION DEVICE

[76] Inventor: Jimmy L. Frank, 17 Woodsborough Cir., Houston, Tex. 77055

[21] Appl. No.: 590,133

[22] Filed: Jan. 23, 1996

[51] Int. Cl.$^6$ ..................................................... F25C 1/18
[52] U.S. Cl. .................................. 62/68; 62/136; 62/204
[58] Field of Search .............................. 62/136, 204, 223, 62/68

[56] References Cited

U.S. PATENT DOCUMENTS

| | | |
|---|---|---|
| Re. 32,360 | 2/1987 | Martineau . |
| 3,180,104 | 4/1965 | Goetz . |
| 3,180,106 | 4/1965 | Brandt et al. . |
| 3,279,205 | 10/1966 | Stoelting . |
| 3,298,190 | 1/1967 | Harker . |
| 3,410,103 | 11/1968 | Cornelius . |
| 3,460,713 | 8/1969 | Cornelius . |
| 3,519,910 | 7/1970 | Pfaff et al. . |
| 3,600,657 | 8/1971 | Pfaff . |
| 3,698,203 | 10/1972 | Stoelting . |
| 3,823,571 | 7/1974 | Smith et al. . |
| 4,093,055 | 6/1978 | Blackburn et al. . |
| 4,275,567 | 6/1981 | Schwitters .................... 62/68 |
| 4,383,417 | 5/1983 | Martineau . |
| 4,736,593 | 4/1988 | Williams . |
| 4,854,923 | 8/1989 | Sexton et al. . |
| 4,869,072 | 9/1989 | Sexton et al. . |
| 5,095,710 | 3/1992 | Black et al. . |
| 5,103,649 | 4/1992 | Kieffer . |
| 5,205,129 | 4/1993 | Wright et al. ................ 62/68 |
| 5,615,559 | 4/1997 | Kress et al. .................. 62/68 |

FOREIGN PATENT DOCUMENTS 0 382 275  8/1990  European Pat. Off. ......... A23G 9/00

59-98653  of 1984  Japan .

OTHER PUBLICATIONS

International Searching Authority: International Search Report; International Application No.: PCT/US 97/00986; International Filing Date: Jan. 22, 1997.

The Cornelius company, FCB (Solid-State) Post-Mix Dispenser Two-Flavor/Hot-Gas Defrost Service Manual, Apr., 24, 1989.

*Primary Examiner*—Henry A. Bennett
*Assistant Examiner*—Susanne C. Tinker
*Attorney, Agent, or Firm*—Arnold, White & Durkee

[57] ABSTRACT

An apparatus and method for controlling the flow rate of refrigerant to a refrigeration device is provided. The system includes a mixing chamber that retains and produces the product, a compressor, and an evaporator secured to the exterior of the mixing chamber for providing freezing of the product being produced within it. The system further includes a expansion valve coupled to the evaporator that regulates the flow of the refrigerant through the evaporator. A scraper rotatably mounted within the mixing chamber is provided for scraping the frozen product from the interior surface of the mixing chamber. A beater motor rotates the scraper. An electronic control is provided for controlling the refrigeration cycle. The electronic control employs a microprocessor which is operated in accordance with an algorithm for controlling the operation of the expansion valve. The microprocessor periodically receives signals from the beater motor indicative of the viscosity of the product being produced within the mixing chamber. The electronic control transmits signals to turn the compressor on and off and adjust the position of the valve in response to the signals received from the beater motor so as to control the rate of refrigerant flowing through the evaporator.

19 Claims, 5 Drawing Sheets

5,743,097

APPARATUS AND METHOD FOR CONTROLLING THE FLOW RATE OF REFRIGERANT TO A REFRIGERATION DEVICE

FIELD OF THE INVENTION

The present invention relates generally to refrigeration systems for refrigeration devices such as frozen beverage machines, ice cream machines, ice makers and similar devices, and more particularly, to an electronic control that regulates the flow rate of refrigerant being supplied to the mixing chamber of a frozen carbonated beverage machine.

BACKGROUND OF THE INVENTION

Frozen carbonated beverage machines are well known in the art. Such equipment is designed to produce a partially frozen beverage from the partial freezing of a combination of carbonated water and syrup. This product is made by continuously scraping the partially frozen beverage from the interior surface of a refrigerated mixing chamber.

Frozen carbonated beverage machines were originally operated electro-mechanically. However, it was found that electro-mechanical systems produced product of inconsistent quality. In particular, electro-mechanical systems would react too slowly or would overcompensate for changes in ambient conditions, rate of beverage dispensing and the like. Such slow reaction or overcompensation had a negative effect on the viscosity of the beverage, causing a drink to become either unacceptably loose or firm and thus of inconsistent quality.

Electronic controls have been recently used to provide for an improved ability to maintain the beverage viscosity within a predetermined desired range. As is known in the art, pulse modulated expansion valves (PMVs) or process control valves can provide for precise refrigeration control. These valves are typically controlled by a computer software algorithm so that the flow rate of refrigerant being supplied to the mixing chamber can be changed quickly in response to sudden changes in the refrigeration requirements in the system.

When a PMV or control valve is used in a refrigeration cycle, varying control schemes are used to increase or decrease flow of the refrigerant through the system. Typically, the inlet and/or outlet temperatures to the evaporator (or other components of the refrigeration cycle) are measured and then used to adjust the flow rate of the refrigerant in response to changing conditions. Such a system is proposed in U.S. Pat. No. 5,095,710 issued to Black et al. The pressure in the refrigeration cycle may also be used with temperature in the algorithm to modify the flow rate of the refrigerant. A drawback of this approach, however, is that it requires the use of several temperature and/or pressure sensors and thus makes for a somewhat complex system for controlling the refrigeration cycle.

The present invention is directed to a simple control scheme for regulating the flow of refrigerant to a refrigeration device that does not use temperature or pressure sensors. The present invention is applicable in any type of frozen beverage machine, ice cream machines, ice makers, and similar devices.

SUMMARY OF THE INVENTION

In one aspect of the present invention, an apparatus for controlling the flow of refrigerant to a refrigeration device is provided. The apparatus includes a mixing chamber that produces a product, an evaporator secured to the exterior of the mixing chamber that freezes the product being produced within the mixing chamber, a compressor connected to the evaporator, and a valve coupled to the evaporator that regulates the flow of refrigerant through the evaporator. The apparatus also includes a scraper within the mixing chamber that scrapes the frozen product from the interior surface of the mixing chamber, and a beater motor that operates the scraper. The apparatus further includes a control circuit connected to the beater motor, the compressor and the valve that controls the refrigeration cycle by controlling the activation of the compressor and the position of the valve. The valve may be a pulse modulated expansion valve, control valve or any other valve well suited to control refrigerant flow. If a pulse modulated expansion valve is used, it is adjusted by controlling the frequency at which the valve opens and closes.

The control circuit receives signals from the beater motor indicative of the viscosity of the product being produced within the mixing chamber and transmits control signals to adjust the position of the valve in response to the signals received from the beater motor so as to control the rate of refrigerant flowing through the evaporator. The control circuit includes a voltage detection circuit and an EPROM connected to a microprocessor. The EPROM is programmed with an algorithm for determining when to turn the compressor on and off and how much the valve should be opened, if at all, in controlling the rate of refrigerant through the evaporator.

The voltage detection circuit includes a current-to-voltage converter connected to the signal received from the beater motor, an isolation device connected to the current-to-voltage converter, and a zero crossing detector connected to the isolation device and the microprocessor. The voltage detection circuit further includes a second isolation device connected to a line voltage supplied to the beater motor and a second zero crossing detector connected to the second isolation device and the microprocessor.

In another aspect of the present invention, a method for controlling the flow of refrigerant to a refrigeration device is provided. In the preferred method, the control circuit instructs the compressor to turn off and the valve to close thereby stopping the flow of refrigerant through the evaporator when the viscosity of the product reaches a predetermined high value. The control circuit also instructs the compressor to turn on the compressor and open the valve thereby initiating the flow of refrigerant through the evaporator when the viscosity of the product reaches a predetermined low value. The control circuit further instructs the valve to remain partially open when the viscosity is between the predetermined low value and the predetermined high value so as to control the rate at which refrigerant flows through the evaporator and thereby control the rate at which the product in the mixing chamber freezes. The percent that the valve is open is directly proportional to the viscosity of the product being produced in the mixing chamber and is determined by the microprocessor utilizing the algorithm stored in the EPROM.

BRIEF DESCRIPTION OF THE DRAWINGS

Other aspects and advantages of the present invention will become apparent upon reading the following detailed description and upon reference to the drawings which.

DETAILED DESCRIPTION OF THE PREFERRED EMBODIMENT

Figure 1:
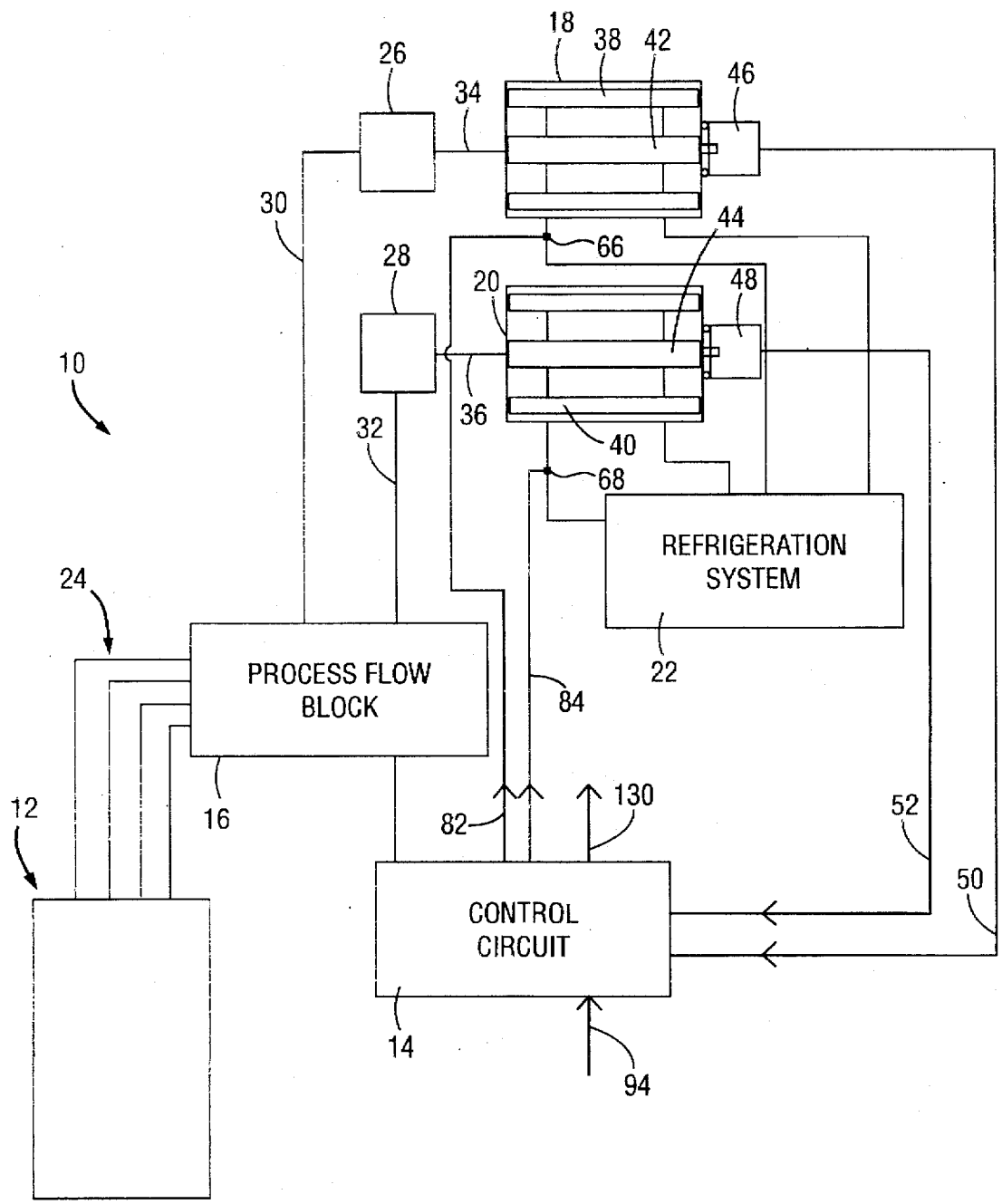
FIG. 1 is a schematic diagram of the basic components of a frozen carbonated beverage machine according to the present invention.

Turning now to the drawings and referring initially to FIG. 1, a system diagram of a frozen carbonated beverage machine according to the present invention is shown generally by reference numeral 10. The system 10 includes an ingredient supply source 12, an electronic control circuit 14, a process flow block 16, a pair of mixing chambers 18 and 20 and a refrigeration system 22.

The supply source 12 supplies carbon dioxide, water and syrup to the process flow block 16 via supply lines 24. The process flow block 16 mixes the ingredients and in turn delivers them to a pair of expansion chambers 26 and 28 via lines 30 and 32, respectively. The expansion chambers 26 and 28 are of the type well known in the art and therefore will not be further described herein. The ingredients are fed into the mixing chambers 18 and 20 from the expansion chambers 26 and 28 via lines 34 and 36, respectively.

The mixing chambers 18 and 20 are each provided with scraper blades 38 and 40 which scrape the partially frozen product off of the interior circumferential surface of the mixing chambers 18 and 20, as the product begins to freeze. The scraper blades 38 and 40 are attached to shafts 42 and 44 which are in turn rotated by beater motors 46 and 48, respectively. The beater motors 46 and 48 provide output signals which are in turn communicated to the control circuit 14 via communication lines 50 and 52, respectively. The output signals contain the readings of the current being drawn by the beater motors 46 and 48. This information is useful in determining the output torque of the beater motors 46 and 48 and thus viscosity of the product in the mixing chambers 18 and 20, as is further explained below.

Figure 2:
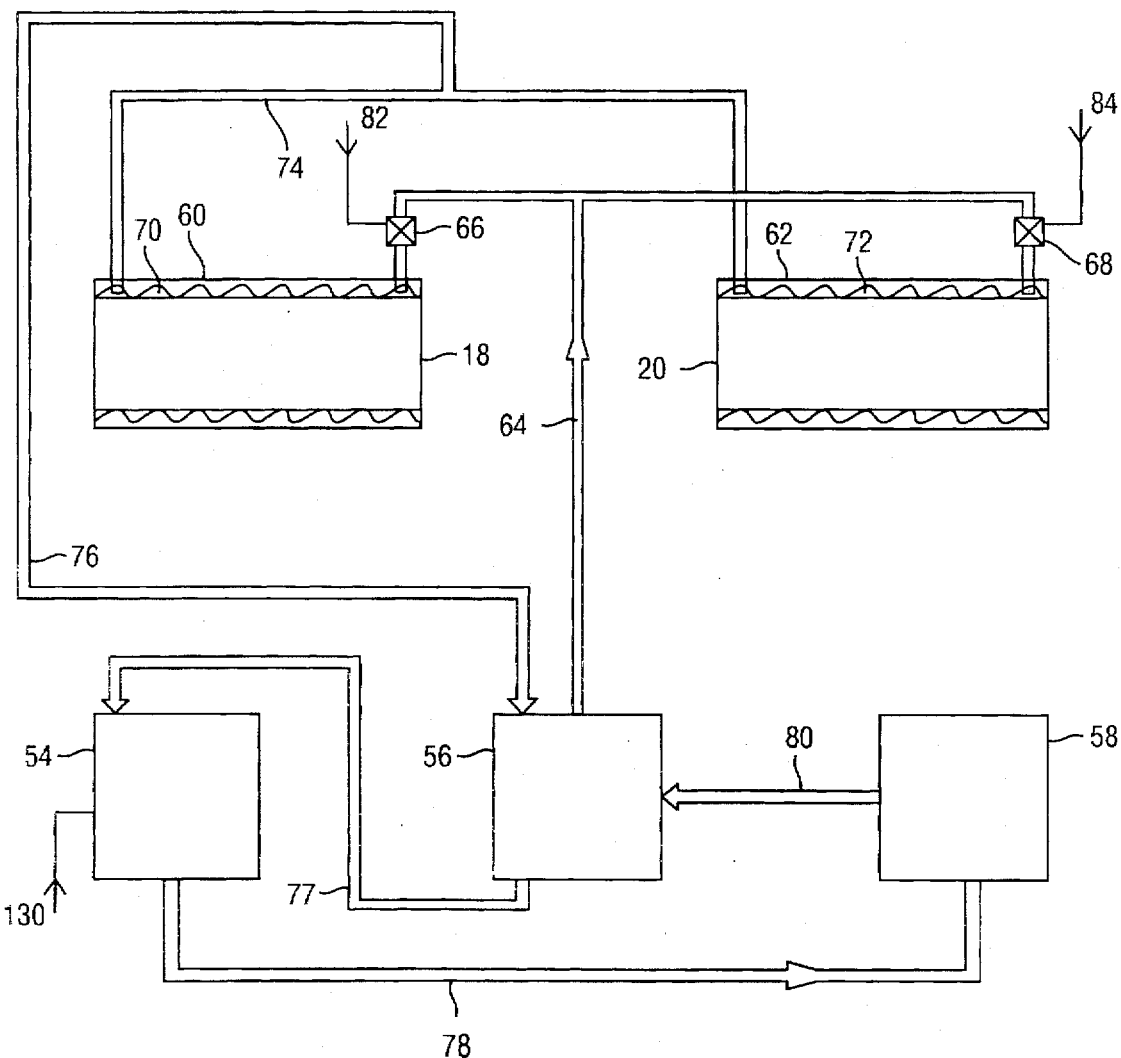
FIG. 2 is a schematic diagram of the refrigeration system of a frozen carbonated beverage machine according to the present invention.

The refrigeration system 22 includes a compressor 54, an accumulator 56, a condensor 58, and a pair of evaporators 60 and 62, as shown in FIG. 2. The accumulator 56 is connected by a line 64 to pulse modulated expansion valves 66 and 68, which control delivery of the refrigerant to the evaporators 60 and 62, respectively. In an alternate design, the pulse modulated expansion valves 66 and 68 may be substituted by control valves. The evaporators 60 and 62 are each defined by a sleeve having an advancing helical groove formed along its inner circumferential surface. The evaporators 60 and 62 are preferably shrink fitted onto the outer surfaces of mixing chambers 18 and 20, respectively. The helical grooves define flow paths 70 and 72 which encircle the mixing chambers 18 and 20, respectively. The refrigerant flows through the flow paths 70 and 72 so as to come into direct contact with the walls of the mixing chambers 18 and 20, respectively. This provides for an efficient heat transfer. The flow paths 70 and 72 empty into a common outlet 74 which, in turn, is connected to the accumulator 56 by line 76.

The accumulator 56 delivers the refrigerant to the compressor 54 via line 77. The compressor 54 delivers the refrigerant to the condensor 58 via line 78. The condensor 58, in turn, delivers the refrigerant to the accumulator 56 via line 80. The operation of the various components of the refrigeration system is well known in the art, and therefore will not be further discussed herein.

The control system for regulating the flow of refrigerant through the refrigeration system will now be discussed as the present invention is directed to this aspect of the frozen carbonated beverage machine. In particular, the present invention is concerned with the flow of the refrigerant through the evaporators 60 and 62. The regulation of this flow is controlled directly by the expansion valves 66 and 68. The expansion valves 66 and 68 are in turn controlled by the control circuit 14, based upon the viscosity of the beverage in the mixing chambers 18 and 20 as will be further explained below. The expansion valves 66 and 68 are connected to the control circuit 14 via communication lines 82 and 84, as shown in FIG. 1.

Figure 3:
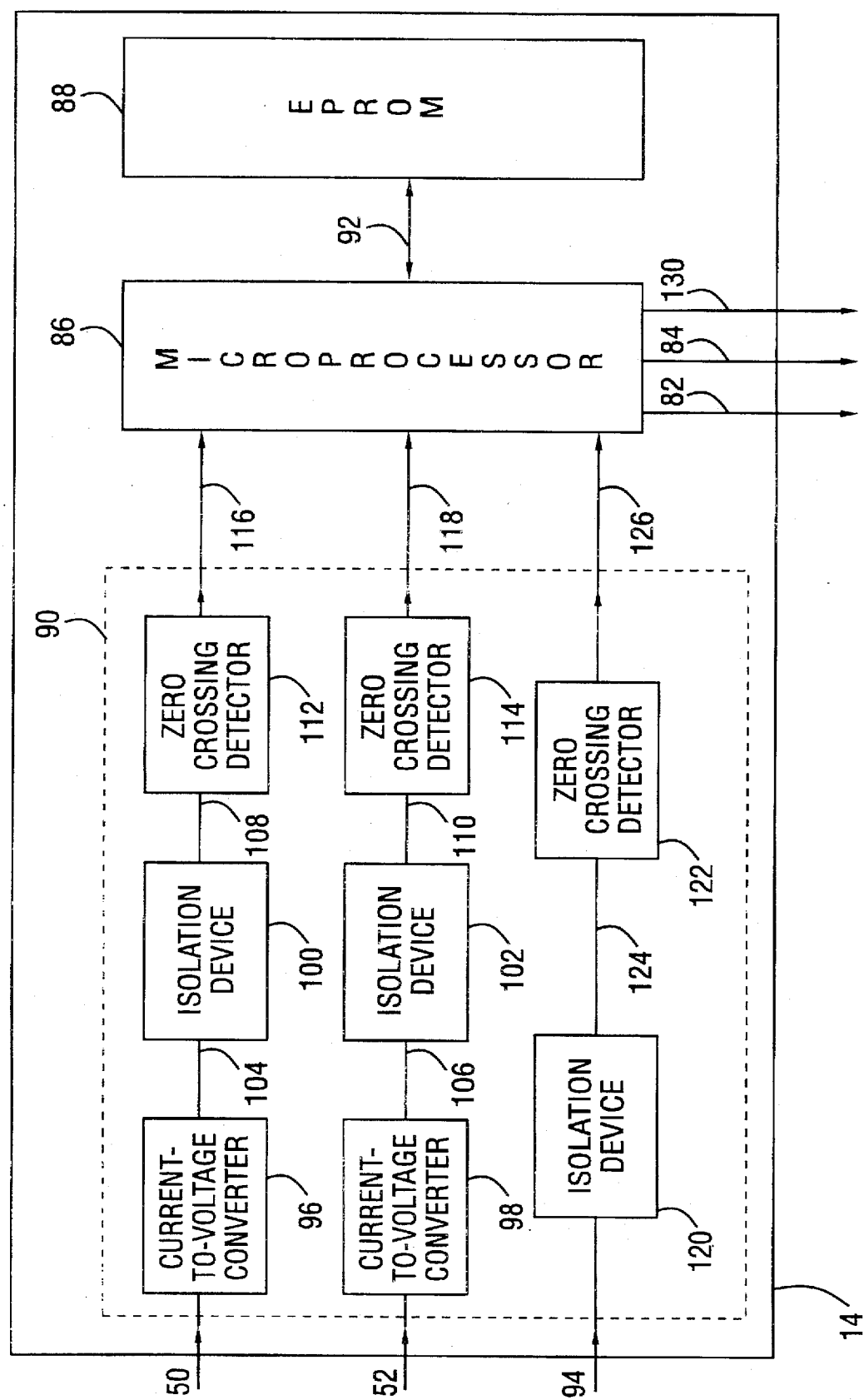
FIG. 3 is a schematic diagram of the circuit which controls the refrigeration cycle according to the present invention.

The control circuit 14 includes a microprocessor 86, an EPROM (erasable programmable only memory) 88, and a voltage detection circuit 90, as shown in FIG. 3. The microprocessor 86 is preferably Motorola part no. 68 HC811. The EPROM is preferably SGS Thomson part no. M27/C512. The microprocessor 86 utilizes an algorithm stored in the EPROM 88 to control the refrigeration cycle for each of the mixing chambers 18 and 20, based upon information provided from the voltage detection circuit 90. The EPROM 88 communicates with the microprocessor 86 via communication line 92.

The voltage detection circuit 90 receives various inputs including the output signals from the beater motors 46 and 48 via communication lines 50 and 52 and the line voltage 94 supplied to the beater motors, as shown in FIG. 3. A pair of current-to-voltage converters 96 and 98 convert the currents drawn by the beater motors 46 and 48, respectively, into sinusoidal voltage values having a maximum value of 1 volt. These current-to-voltage converters 96 and 98 are resistors of a type well known in the art. The signals associated with these sinusoidal voltage values are communicated to a pair of isolation devices 100 and 102 via communication lines 104 and 106. The isolation devices 100 and 102 are transformers of the type well known in the art. They function to step up the output voltage from a maximum of 1 volt to a maximum of 5 volts. Thus, the output of the isolation devices 100 and 102 is a sinusoidal voltage having a maximum value of 5 volts. The voltage outputs from the isolation devices 100 and 102 are in turn communicated via communication lines 108 and 110 to a pair of zero crossing detectors 112 and 114, respectively. The zero crossing detectors 112 and 114 are the type well known in the art. The zero crossing detectors 112 and 114 convert the sinusoidal voltage values received from the isolation devices 100 and 102 into logic values of "0" or "1" which can be understood and processed by the microprocessor 86. The output is one logic value, e.g., 0 if the voltage value is non-negative and another logic value, e.g., 1 if the voltage value is negative. These logic values are communicated to the microprocessor via communication lines 116 and 118.

The line voltage 94 is communicated to an isolation device 120 which is identical to isolation devices 100 and 102. It reduces the line voltage from 240 volts to a maximum of 5 volts. The reduced sinusoidal line voltage is then communicated to a zero crossing detector 122 via communication line 124. The zero crossing detector 122 in turn converts the voltage signal received from the isolation device 120 into a logic value and in turn communicates this logic value to the microprocessor 86 via communication line 126.

The microprocessor 86, employing a timer (not shown), determines the time difference between the instant that the zero crossing detector 112 begins detecting a non-negative voltage signal emanating from the beater motor 46 load circuit and the instant that the zero crossing detector 120 begins detecting a non-negative voltage signal from the line voltage 94. This time difference or phase difference between the voltage signals is known as the "beater count" and relates directly to the power consumption of the beater motor 46. Similarly, the microprocessor 86 determines the time difference between the instant that the zero crossing detector 114 begins detecting a non-negative voltage and the instant that the zero crossing circuit 120 begins detecting a non-negative voltage signal from the line voltage. This latter "beater count" relates directly to the power consumption of the beater motor 48.

It is well known in the art that the power consumption of the beater motors 46 and 48 relate directly to the torque of the beater motors and that the torque of the beater motors relates directly to the viscosity of the beverage product in the mixing chambers 18 and 20.

Figure 4:
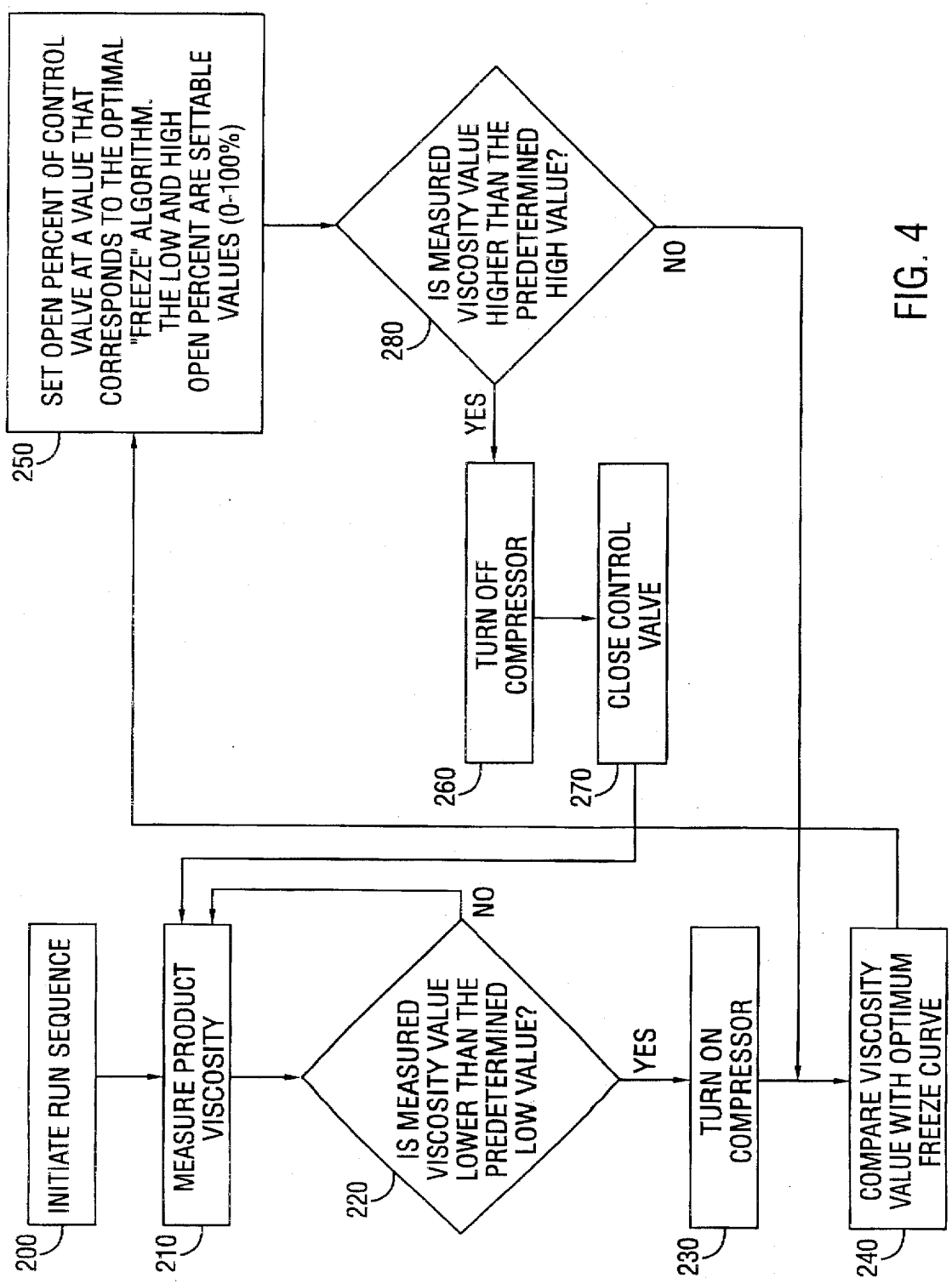
FIG. 4 is a flow diagram showing the steps performed by an algorithm according to the present invention which controls the flow of refrigerant through the refrigeration system.

The present invention uses the power consumption/torque information from the beater motors 46 and 48 to control the refrigeration cycles for the mixing chambers 18 and 20. A flow diagram of the process steps performed by the microprocessor 86 for controlling these refrigeration cycles is shown in FIG. 4. For simplicity sake, this discussion will be directed to the flow sequence as it pertains to one of the mixing chambers, e.g., mixing chamber 18. As should be understood by those of ordinary skill in the art, the same routine applies to the mixing chamber 20. Furthermore, for simplicity sake the viscosity value will be used to describe the process steps. In the preferred embodiment, however, the "beater count" measurement which is indicative of the viscosity is actually used. As will be further appreciated by those of ordinary skill in the art, there is no need to convert the "beater count" measurement into a torque or viscosity value to carry out the process according to the present invention.

After a start point (block 200), the viscosity of the product in the mixing chamber 18 is measured (block 210) based upon the phase difference in the current signal 50 and the voltage signal 94, as shown in FIG. 4. The measured viscosity value 210 is then compared to a predetermined low set point viscosity value. This comparison is made in the decision block 220. The predetermined low set point viscosity value is stored in the EPROM 88 and is selectable by the operator. It is the value at which the viscosity of the product being produced is at its lowest "acceptable" value, i.e., the product is as liquidy as is desired. This value is also known as the "thaw value" and may be empirically determined.

If the measured viscosity 210 is not lower than the predetermined low set point value then the viscosity of the product in the mixing chamber 18 is again measured. The viscosity of the product in the mixing chamber 18 is repeatedly measured until its value is below the predetermined low set point value, at which point the compressor 54 is turned on (block 230). The compressor 54 receives its instruction to turn on (and off) from the control circuit 14 via communication line 130, as shown in FIGS. 1–2. Once the compressor 54 is turned on, the viscosity of the product in the mixing chamber 18 is continuously measured and compared to an optimum freeze curve (block 240) which is part of the algorithm stored in the EPROM 88 and utilized by the microprocessor 86. From the optimum freeze curve, the algorithm sets the open percent of the expansion valve 66 (block 250) based on the viscosity measurement and thereby controls the flow of refrigerant to the mixing chamber 18. So long as the measured viscosity value exceeds the predetermined low set point value, the expansion valve 66 remains open. If, however, the measured viscosity value should exceed a predetermined high set point value, then the compressor 54 is turned off (block 260) and the expansion valve 66 is closed (block 270). The comparison of the measured viscosity value to the predetermined high set point value is made in the decision block 280.

Like the predetermined low set point value, the predetermined high set point value is stored in the EPROM 88 and is selectable by the operator. It is the value at which the viscosity of the product being produced is at its highest "acceptable" value, i.e., the product is as frozen as is desired. This value is also known as the "freeze value" and may be empirically determined.

Figure 5:
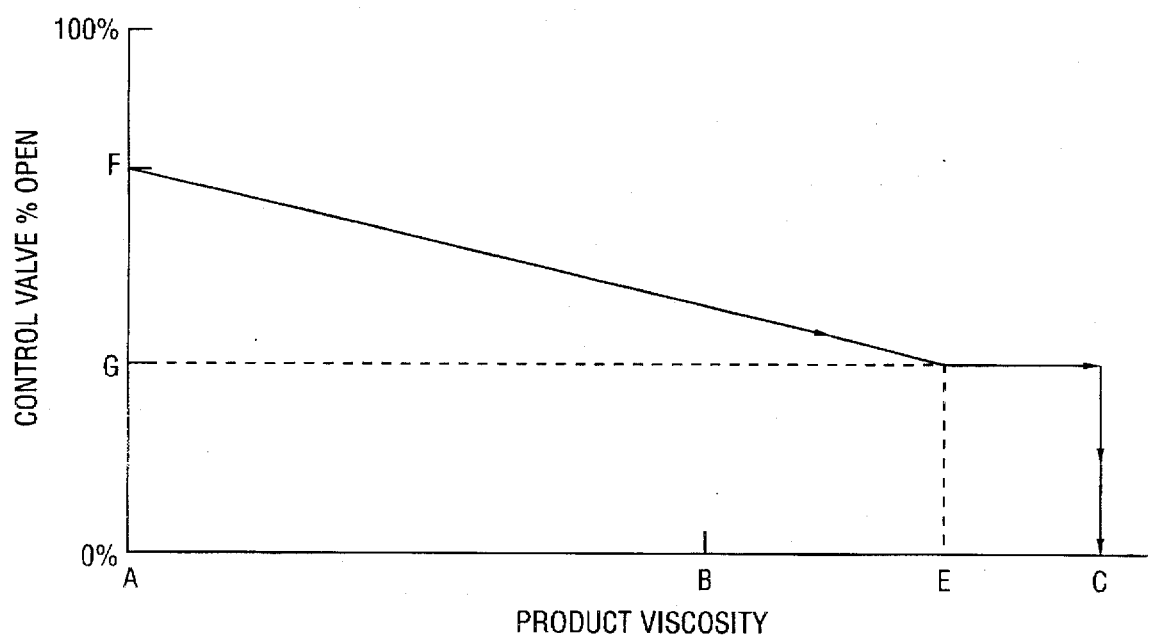
FIG. 5 is a graph showing the optimum freeze curve utilized by the algorithm according to the present invention.

The optimum freeze algorithm employs the optimum freeze curve shown in FIG. 5 which plots the open percent of the expansion valve as a function of product viscosity. This optimum freeze curve is established through a process of empirical testing. The curve is constructed first by selecting maximum and minimum percent open values. The maximum percent open value indicated by the point F is the value that maximizes heat transfer when the product is a liquid. This value varies depending upon whether one or both mixing chambers are being supplied with refrigerant, the compressor being used, and other components being used. This value may vary, for example, between 60% and 100%. The minimum percent open value indicated by the point G is the value that maximizes heat transfer in the refrigeration cycle when the product is in a semi-frozen state. This value may also vary depending upon the same factors affecting the maximum percent open value, and is typically between 20% and 60%.

As the refrigeration cycle continues and the product begins to freeze, the viscosity of the product increases and the optimum refrigerant flow is found to follow the path illustrated in FIG. 5. This path is generally linear, i.e., follows the equation $y=mx+b$. As will be appreciated by those skilled in the art, other curves could be used, e.g., a second order polynomial expression to fit the empirical test data. It has been found that optimum results are obtained by allowing the flow to remain constant once the minimum flow condition (i.e., where the open percentage is at a minimum) is reached to allow the semi-frozen liquid to freeze at a slow rate and mix in the chamber thoroughly. This reduces the gradient of temperature that occurs from the wall to the center of the mixing chamber.

The point A is a baseline value. It is the point at which the product is completely liquid and, thus, the point at which the viscosity is at an absolute minimum. The point B is the thaw value. It is the point at which the frozen product begins to thaw. This value is a settable value and is empirically determined. The point C is the freeze value. It is the point at which the product has reached its desired consistency. It also is a settable value and is empirically determined. The point E is thee point at which the rate of refrigerant flow becomes constant. It is equal to $(B+(C-B)/D)$ where D is 2. The point D is a settable value and has been derived empirically. As the product becomes frozen, the viscosity continues along the constant rate portion of the graph until the viscosity reaches the maximum viscosity setting or "freeze" value. At this point the compressor 54 is turned off and the expansion valve 66 (or 68) is fully closed.

Those skilled in the art who have the benefit of the present disclosure will appreciate that the present invention may take many forms and embodiments. For example, other control routines could be used to control refrigerant flow using the measured viscosity of the product. It is intended that the embodiments described herein should be illustrative only, and not limiting of the present invention. Rather, it is intended that the invention cover all modifications, equivalents and alternatives falling within the spirit and scope of the invention as defined by the appended claims.

What is claimed is:

1. An apparatus for controlling the flow of refrigeration device, comprising:
   (a) a mixing chamber that produces a product;
   (b) an evaporator that freezes the product being produced within the mixing chamber;
   (c) a valve coupled to the evaporator that regulates the flow of refrigerant through the evaporator;
   (d) a scraper disposed in the mixing chamber that scrapes the frozen product from the interior surface of the mixing chamber;
   (e) a beater motor that operates the scraper; and
   (f) a control circuit connected to the beater motor and the, the control circuit receiving signals from the beater motor indicative of the viscosity of the product being produced within the mixing chamber and transmitting control signals to open, close and vary the open percent of the valve in response to the signals received from the beater motor so as to control the rate of refrigerant flowing through the evaporator.

2. The apparatus for controlling the flow of refrigerant to a refrigeration device according to claim 1, further comprising a compressor connected to the evaporator and the control circuit.

3. The apparatus for controlling the flow of refrigerant to a refrigeration device according to claim 1, wherein the valve includes a pulse modulated expansion valve which is adjusted by controlling the frequency at which the valve opens and closes.

4. The apparatus for controlling the flow of refrigerant to a refrigeration device according to claim 1, wherein the valve includes a control valve.

5. The apparatus for controlling the flow of refrigerant to a refrigeration device according to claim 1, wherein the control circuit includes a voltage detection circuit and an EPROM connected to a microprocessor.

6. The apparatus for controlling the flow of refrigerant to a refrigeration device according to claim 5, wherein the voltage detection circuit includes a current-to-voltage converter connected to the signal received from the beater motor, an isolation device connected to the current-to-voltage converter, and a zero crossing detector connected to the isolation device and the microprocessor.

7. The apparatus for controlling the flow of refrigerant to a refrigeration device according to claim 6, wherein the voltage detection circuit further includes a second isolation device connected to a line voltage supplied to the beater motor and a second zero crossing detector connected to the second isolation device and the microprocessor.

8. The apparatus for controlling the flow of refrigerant to a refrigeration device according to claim 5, wherein the control circuit instructs the compressor to turn off and the valve to close thereby stopping the flow of refrigerant through the evaporator when the viscosity of the product reaches a predetermined high value which is preselected and stored in the EPROM.

9. The apparatus for controlling the flow of refrigerant to a refrigeration device according to claim 8, wherein the control circuit instructs the compressor to turn on and the valve to open thereby initiating the flow of refrigerant through the evaporator when the viscosity of the product reaches a predetermined low value which is preselected and stored in the EPROM.

10. The apparatus for controlling the flow of refrigerant to a refrigeration device according to claim 9, wherein the control circuit instructs the valve to partially open when the viscosity is between the predetermined low value and the predetermined high value so as to control the rate at which refrigerant flows through the evaporator and thereby control the rate at which the product in the mixing chamber freezes, the percent that the valve is open being directly proportional to the viscosity of the product being produced in the mixing chamber.

11. A method for controlling the flow of refrigerant in a refrigeration device having a mixing chamber that produces a product, an evaporator secured to the exterior of the mixing chamber that freezes the product being produced within the mixing chamber, a valve coupled to the evaporator for regulating the flow of refrigerant through the evaporator, a scraper disposed in the mixing chamber that scrapes the frozen product from the interior surface of the mixing chamber, a beater motor that operates the scraper, and a control circuit connected to the beater motor and the valve, comprising the steps of:
   (a) transmitting a signal from the beater motor to the control circuit indicative of the viscosity of the product being produced within the mixing chamber;
   (b) determining an instruction to communicate to the valve based on the signal received from the beater motor; and
   (c) transmitting the instruction to the valve via a control signal, said control signal being used to open, close, and vary the open percent of the valve so as to control the rate of refrigerant flowing through the evaporator.

12. The method for controlling the flow of refrigerant to a refrigeration device according to claim 11, wherein the signal originating from the beater motor represents the current being drawn by the beater motor, and the method further comprises the step of converting this current signal into a voltage signal.

13. The method for controlling the flow of refrigerant to a refrigeration device according to claim 12, further comprising the step of converting the voltage signal corresponding to the beat motor current into a logic value, wherein a first logic value is assigned if the voltage is non-negative and a second logic value is assigned if the voltage is negative.

14. The method for controlling the flow of refrigerant to a refrigeration device according to claim 13, further comprising the step of converting a line voltage supplied to the beater motor into a logic value, wherein a first logic value is assigned if the voltage is non-negative and a second logic value is assigned if the voltage is negative.

15. The method for controlling the flow of refrigerant to a refrigeration device according to claim 14, further comprising the step of determining the time difference between the instant that the first logic value is assigned to the signal originating from the beater motor and the instant that the first logic value is assigned to the signal originating from the line voltage, said time difference being related to the viscosity of the product in the mixing chamber.

16. The method for controlling the flow of refrigerant to a refrigeration device according to claim 15, further comprising the step of closing the valve when the viscosity in the mixing chamber reaches a predetermined high value which is preselected and stored in the EPROM.

17. The method for controlling the flow of refrigerant to a refrigeration device according to claim 16, further comprising the step of reopening the valve when the viscosity of the product in the mixing chamber reaches a predetermined low value which is preselected and stored in the EPROM.

18. The method for controlling the flow of refrigerant to a refrigeration device according to claim 17, further comprising the step of adjusting the position of the valve to a partially open condition when the viscosity of the product in the mixing chamber is between the predetermined low value and the predetermined high value, the percent that the valve is open being directly proportional to the viscosity of the product being produced in the mixing chamber.

19. A method for controlling the flow of refrigerant to a refrigeration device according to claim 14, further comprising the step of changing the voltage signals so that the maximum voltage does not exceed 5 volts prior to converting the voltage signals to logic values.

* * * * *